(12) United States Patent
Matsui

(10) Patent No.: US 10,474,256 B2
(45) Date of Patent: Nov. 12, 2019

(54) IMAGE DISPLAY APPARATUS RECEIVING OPERATIONS USING MULTIPLE ELECTRONIC PENS

(71) Applicant: Sharp Kabushiki Kaisha, Sakai, Osaka (JP)

(72) Inventor: Kuniaki Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/860,695

(22) Filed: Jan. 3, 2018

(65) Prior Publication Data

US 2018/0203527 A1 Jul. 19, 2018

(30) Foreign Application Priority Data

Jan. 19, 2017 (JP) ................................. 2017-007857

(51) Int. Cl.
*G06F 3/038* (2013.01)
*G06F 3/0354* (2013.01)
*G06F 3/0481* (2013.01)
*G06F 3/0482* (2013.01)
*G06T 11/20* (2006.01)
*G06T 3/40* (2006.01)
*G06F 3/0488* (2013.01)
(Continued)

(52) U.S. Cl.
CPC .......... *G06F 3/038* (2013.01); *G06F 3/03545* (2013.01); *G06F 3/03547* (2013.01); *G06F 3/0428* (2013.01); *G06F 3/0482* (2013.01); *G06F 3/0488* (2013.01); *G06F 3/04817* (2013.01); *G06F 3/04847* (2013.01); *G06T 3/40* (2013.01); *G06T 11/203* (2013.01); *G06F 2203/0382* (2013.01)

(58) Field of Classification Search
CPC .. G06F 3/038; G06F 3/03545; G06F 3/03547; G06F 3/04817; G06F 3/0482; G06F 3/0488; G06T 3/40; G06T 11/203
USPC ......................................................... 345/179
See application file for complete search history.

(56) References Cited

U.S. PATENT DOCUMENTS

2015/0138082 A1   5/2015  Nagata
2015/0199036 A1*  7/2015  Akitomo ............. G06F 3/03545
                                                345/173
2016/0054851 A1*  2/2016  Kim ....................... G06F 3/0488
                                                345/174

FOREIGN PATENT DOCUMENTS

JP    2014-10531 A    1/2014
JP    2015-132986 A   7/2015

* cited by examiner

*Primary Examiner* — Jennifer Mehmood
*Assistant Examiner* — Ngan T Pham Lu
(74) *Attorney, Agent, or Firm* — Keating & Bennett, LLP

(57) ABSTRACT

An image display apparatus includes an operation detecting unit, a display unit displaying an image, and a controller. The operation detecting unit receives drawing operations performed with electronic pens and state signals indicating operation states of the pens. The controller generates drawing data in response to each drawing operation, displays setting menus for the pens and the drawing data on the display unit, and determines whether each pen is being operated. From each pen, the operation detecting unit receives, as the state signal, a signal indicating whether the pen is moved or indicating the degree of the speed of a movement of the pen. The controller determines whether each pen is being operated based on the state signal. When the pen is being operated, the setting menu for the pen is displayed in a display mode depending on the degree of speed of the movement.

10 Claims, 8 Drawing Sheets

(51) Int. Cl.
*G06F 3/042* (2006.01)
*G06F 3/0484* (2013.01)

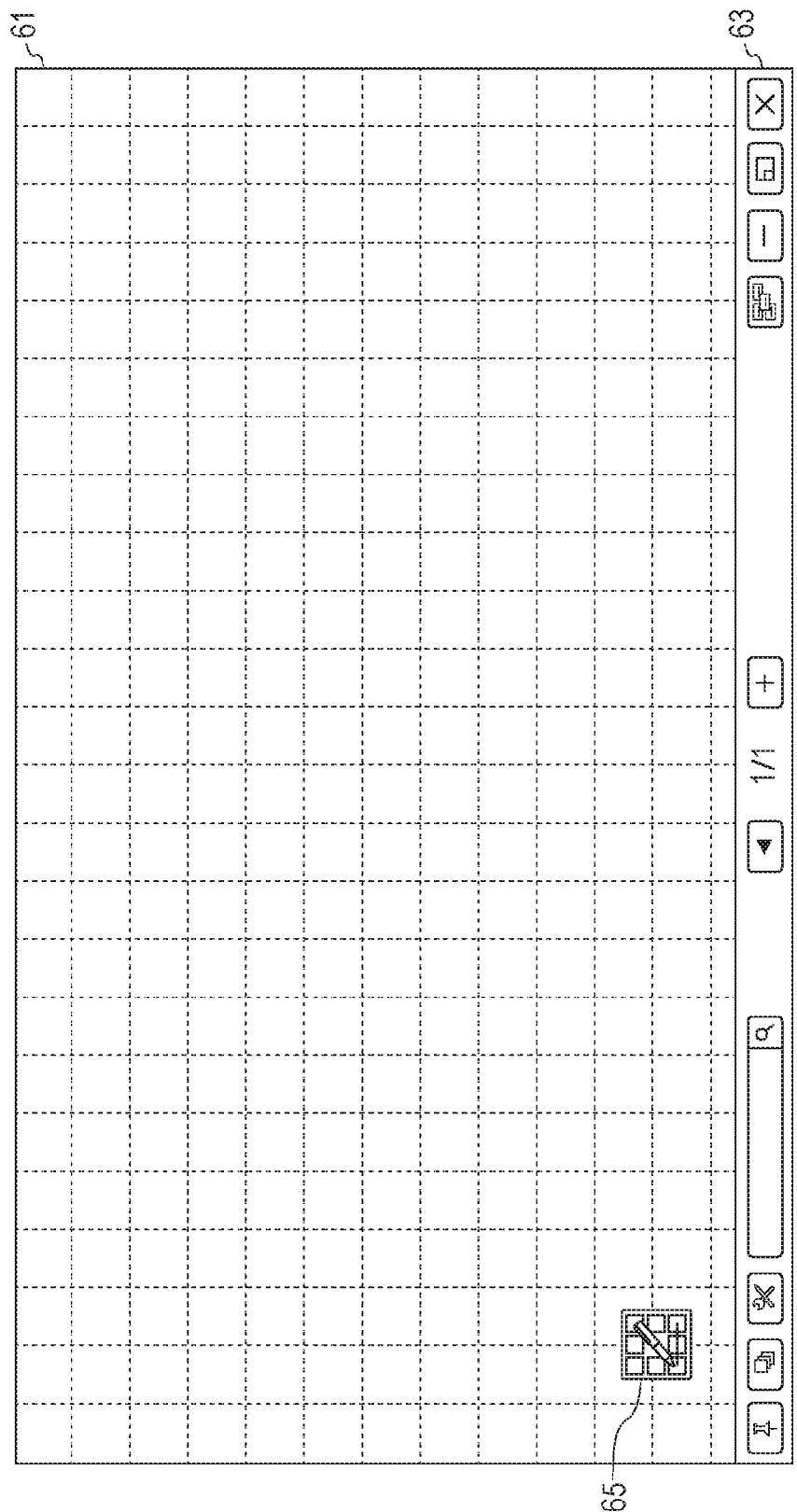

IMAGE DISPLAY APPARATUS RECEIVING OPERATIONS USING MULTIPLE ELECTRONIC PENS

BACKGROUND

1. Field

The present disclosure relates to an image display apparatus receiving operations using multiple electronic pens.

2. Description of the Related Art

Touch panel displays for personal use, such as so-called tablet terminals, are designed based on the premise that a single pen is used to perform operations. Typically, touch panel displays have sizes of 16 inches or less because a high priority is given to portability. Special consideration is not given to support for simultaneous writing by multiple persons.

Other than displays for personal use, large touch panel displays used as electronic whiteboards are used. In the case of such large touch panel displays, multiple persons may simultaneously operate different electronic pens. Such displays have a configuration in which a specific color, a thickness, and the like may be set for each electronic pen by using a graphic user interface (GUI).

In the case where it is assumed that only one electronic pen is used, screen design in which a belt-like setting menu having icons arranged therein is disposed in an end portion of a touch panel display is typically employed. However, when it is assumed that multiple electronic pens are used, the belt-like setting menu occupies a large area, which is an obstacle. Therefore, for example, some displays employ a design in which a setting menu icon that is capable of being expanded and moved through particular operations is displayed at a position specified by a user of the touch panel display.

However, a matter to be considered when multiple electronic pens are used is not limited to an area occupied by a setting menu. For example, a high priority is to be given also to a user's easy grasp, without fail, to show which object displayed on a touch panel display corresponds to which electronic pen.

On this point, the following technique has been proposed. When data, which indicates that an external apparatus has been operated, has been received, a corresponding cursor is displayed on a display unit. When data, which indicates that an external apparatus has been operated, has not been received for a given period, the corresponding cursor is removed from the display unit (For example, see Japanese Unexamined Patent Application Publication No. 2014-010531).

In addition, the following technique has been proposed. A touch pen having detected the state in which the touch pen is held by a user transmits the ID of the touch pen. Upon reception of the ID, a partial image (icon) indicating the setting state of the touch pen is displayed. In response to a touch on the partial image, a setting menu is displayed. Thus, a user may easily check the setting state for a touch operation, and may easily change the settings (for example, see Japanese Unexamined Patent Application Publication No. 2015-132986).

Even in the technique in Japanese Unexamined Patent Application Publication No. 2015-132986, when multiple electronic pens are used simultaneously, a user may erroneously change settings of an unintended electronic pen, and may fail to set an intended electronic pen. In addition to this situation, a user has to perform a troublesome operation of searching for a corresponding setting menu icon in order to change settings of an intended electronic pen.

SUMMARY

It is desirable to provide an image display apparatus in which, even when multiple electronic pens are used simultaneously, setting each of the electronic pens or checking the settings may be easily performed without confusion with the other electronic pens.

According to an aspect of the disclosure, there is provided an image display apparatus including an operation detecting unit, a display unit, and a controller. The operation detecting unit receives drawing operations and state signals. The drawing operations are performed by using a plurality of electronic pens. Each of the state signals indicates an operation state of a corresponding one of the plurality of electronic pens. The display unit displays an image. The controller generates drawing data in response to each of the drawing operations, and displays setting menus and the drawing data on the display unit. Each of the setting menus is displayed for a corresponding one of the plurality of electronic pens. The controller determines whether or not each of the plurality of electronic pens is being operated. The operation detecting unit receives, from each of the plurality of electronic pens, a signal as the state signal. The signal indicates whether or not the electronic pen is moved or indicating a degree of a speed of a movement of the electronic pen. The controller determines whether or not each of the plurality of electronic pens is being operated on the basis of the state signal from the electronic pen. In accordance with whether or not the electronic pen is being operated, when the electronic pen is being operated, the setting menu corresponding to the electronic pen is displayed in a display mode that is different depending on the degree of the speed of the movement.

BRIEF DESCRIPTION OF THE DRAWINGS

FIG. 5 is a diagram for describing an exemplary screen displayed when pen software is performed, according to an embodiment;

DESCRIPTION OF THE EMBODIMENTS

The present disclosure will be further described below by using the drawings. The description below is exemplary in all respects. It is to be understood that the description below dose not limit the disclosure.

First Embodiment

Figure 1:
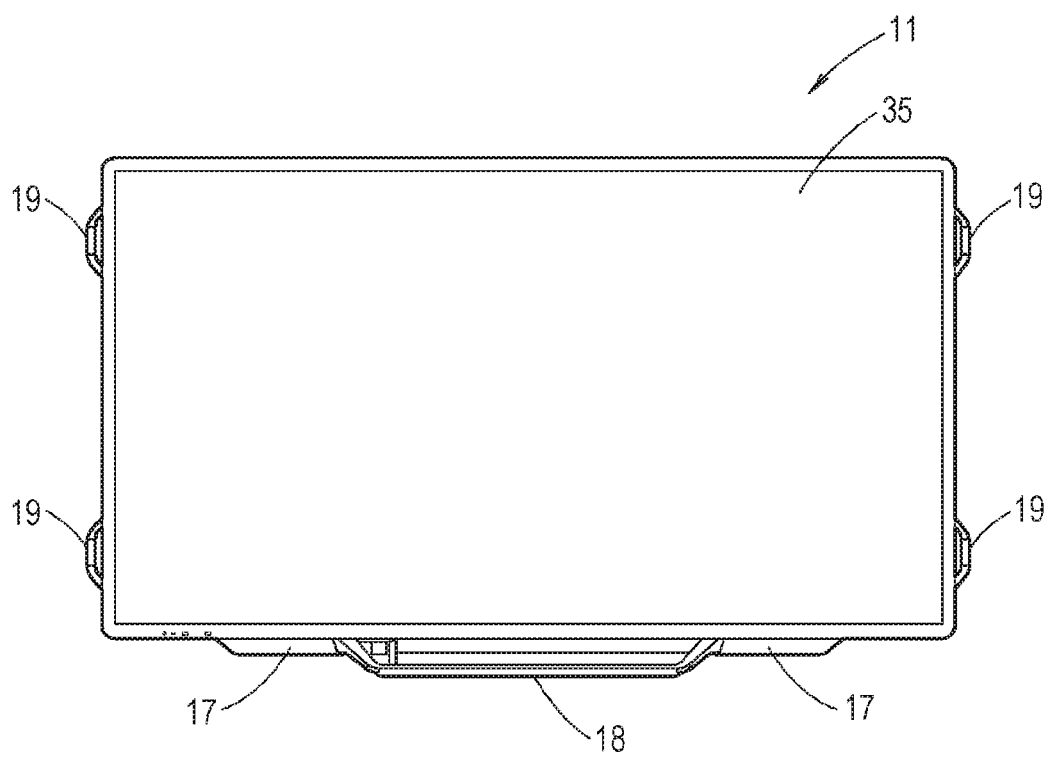
FIG. 1 is a front view of the outer appearance of an image display apparatus body according to an embodiment.

FIG. 1 is a front view of the outer appearance of an image display apparatus body according to a first embodiment.

As illustrated in FIG. 1, an image display apparatus 11 has a display panel 35 occupying most of the front surface. The display panel 35 is, for example, a liquid-crystal display panel, but is not limited to this. The display panel 35 may be a display apparatus of another type such as organic electroluminescence (EL). When a user touches the surface of the display panel 35 with an electronic pen or their fingertip, a touch sensor serving as an operation detecting unit 15 (not illustrated in FIG. 1) detects the position and the touch. In a central portion below the display panel 35, a tray 18 for putting electronic pens and the like is disposed. Speakers 17 are disposed on the right and left sides of the tray 18. On each of the right and left sides of the display panel 35, two handles 19 for carrying the apparatus are disposed at upper and lower positions.

Configurations of the Image Display Apparatus and an Electronic Pen

Figure 2:
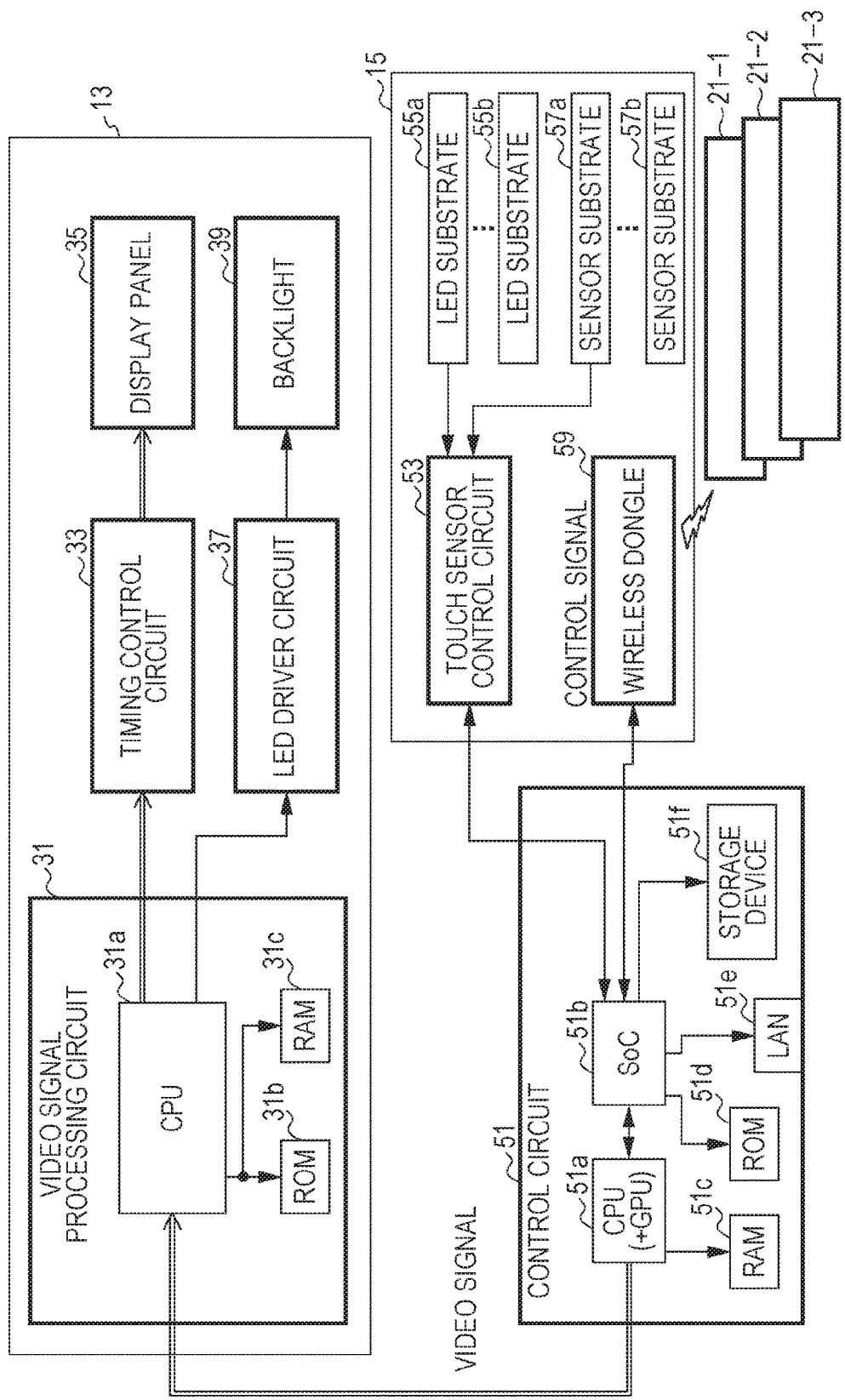
FIG. 2 is a block diagram illustrating the electrical configuration of the image display apparatus according to an embodiment.

FIG. 2 is a block diagram illustrating the electrical configuration of the image display apparatus according to the first embodiment. As illustrated in FIG. 2, the image display apparatus 11 includes a display unit 13 and the operation detecting unit 15, and also includes a control circuit 51 serving as a controller. The image display apparatus 11 further includes multiple electronic pens illustrated as a first electronic pen 21-1, a second electronic pen 21-2, and a third electronic pen 21-3.

The control circuit 51 includes a central processing unit (CPU) 51a serving as a central unit, a system-on-a-chip, that is, a SoC 51b, a random-access memory (RAM) 51c, a read-only memory (ROM) 51d, a local-area network (LAN) 51e, and a storage device 51f. The CPU 51a may include a graphics processing unit (GPU). The SoC 51b is a chip on which peripheral circuits of the CPU 51a, such as an input/output port and a timer, are integrated. The RAM 51c and the ROM 51d are memories. The LAN 51e is a communication interface with external equipment. The storage device 51f is a nonvolatile storage device, such as a hard disk device or a solid state drive.

The CPU 51a performs processing on the basis of control programs stored in the storage device 51f. The processing encompasses pen software for receiving operations using electronic pens.

The display unit 13 includes a video signal processing circuit 31, a timing control circuit 33, the display panel 35, a light-emitting diode (LED) driver circuit 37, and a backlight 39.

The video signal processing circuit 31 performs a scaling process on a video signal which is output from the control circuit 51, and transmits the resulting signal to the timing control circuit 33. The video signal processing circuit 31 includes a CPU 31a, a ROM 31b, and a RAM 31c. The timing control circuit 33 generates a signal for driving the display panel 35. An example of the display panel 35 in FIG. 1 is a liquid-crystal display panel. A liquid-crystal display panel is not selfluminous. Therefore, the display unit 13 illustrated in FIG. 2 includes the LED backlight 39 and the LED driver circuit 37 for driving the backlight 39. In contrast, for example, a selfluminous display panel such as an organic EL panel does not need a backlight.

The operation detecting unit 15 includes a touch sensor control circuit 53, LED substrates 55a, 55b, etc., sensor substrates 57a, 57b, etc., and a wireless dongle 59.

The touch sensor control circuit 53 controls a touch sensor. In FIG. 1, the touch sensor is formed by using the LED substrates 55a, 55b, etc., which are disposed in a first frame portion of the display panel, and the sensor substrates 57a, 57b, etc., which are disposed in a second frame portion opposite the first frame portion. The touch sensor control circuit 53 causes beams to be output in a grid shape from the LED array disposed near the surface of the display panel 35, and detects blocked beams produced due to a touch on the display panel 35 with a fingertip or an electronic pen. The control circuit 51 determines occurrence of a touch operation and the position of the touch on the basis of the signal from the touch sensor control circuit 53. For example, an electronic pen is equipped with a pressure-sensitive sensor at the pen point. An electronic pen which has touched the display panel 35 or the like with the pen point notifies the control circuit 51 via the wireless dongle 59 of information about the touch operation and the identification code (ID) of the electronic pen. The touch sensor is not limited to the above-described sensor using a light blocking system. For example, a sensor using a capacitive system may be used.

The storage device 51f stores in advance the ID and the setting data of each electronic pen. When a user changes settings for each electronic pen by using a setting menu, the CPU 51a updates the setting data of the target electronic pen stored in the storage device 51f. The setting data indicates settings for the type, the color, the line thickness, and the like of an electronic pen which are set by using a setting menu illustrated in FIG. 6A or FIG. 6B as described below.

The wireless dongle 59 is a communication adaptor for wirelessly communicating with the first electronic pen 21-1, the second electronic pen 21-2, and the third electronic pen 21-3. The wireless dongle 59 operates by being connected to a Universal Serial Bus (USB) connector terminal included in the control circuit 51. A drawing operation using an electronic pen is performed by transmitting data between the electronic pen and the control circuit 51 via the wireless dongle 59.

Figure 3:
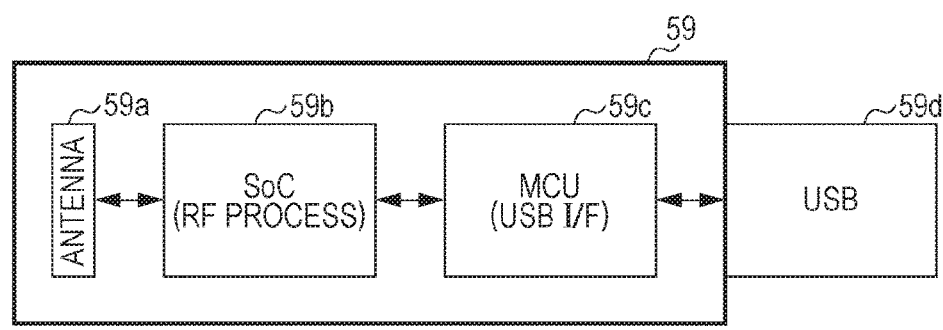
FIG. 3 is a block diagram illustrating an exemplary configuration of a wireless dongle according to an embodiment.

FIG. 3 is a block diagram illustrating an exemplary configuration of the wireless dongle 59. As illustrated in FIG. 3, the wireless dongle 59 includes an antenna 59a, a system-on-a-chip (SoC 59b) which processes a wireless signal in the radio frequency band, a micro controller unit (MCU 59c) which performs communication interface processing, and a USB connector 59d.

Prior to use of an electronic pen, a user connects the wireless dongle 59 to the USB connector of the control circuit 51, establishes a wireless connection, and registers the electronic pen. Multiple electronic pens may be registered for a single wireless dongle. In the first embodiment, the wireless communication is compliant with the Bluetooth® standard. An electronic pen is registered by establishing pairing between the image display apparatus 11 body and the electronic pen. As a matter of course, Bluetooth is merely an example, and another wireless communication system may be used.

In the first embodiment, the configuration in which the wireless dongle 59 serves as a communication interface between an electronic pen and the image display apparatus body is described. A configuration in which the image display apparatus includes the functions of the wireless dongle 59 is also included in the scope of the present disclosure.

Figure 4:
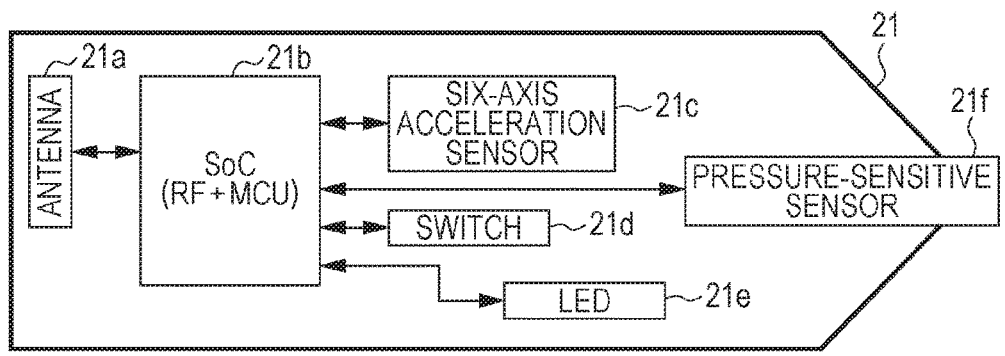
FIG. 4 is a block diagram illustrating an exemplary configuration of an electronic pen according to an embodiment.

FIG. 4 is a block diagram illustrating an exemplary configuration of an electronic pen. The first electronic pen 21-1, the second electronic pen 21-2, and the third electronic pen 21-3 in FIG. 1 have a similar configuration. In FIG. 4, an electronic pen 21 typifying these electronic pens is illustrated.

As illustrated in FIG. 4, the electronic pen 21 includes an antenna 21a, a system-on-a-chip (SoC 21b), an acceleration sensor 21c, a switch 21d, an LED 21e, and a pressure-sensitive sensor 21f. The SoC 21b is provided with the functions of the SoC 59b and the MCU 59c of the wireless dongle 59.

The MCU in the SoC 21b controls the acceleration sensor 21c, the switch 21d, the LED 21e, and the pressure-sensitive sensor 21f. The acceleration sensor 21c detects acceleration in each of the six-axis directions, that is, the positive and negative directions of the X, Y, and Z axes orthogonal to one another.

The switch 21d is also provided with the function of a power switch, and detects a user operation. The LED 21e displays a warning for remaining battery power (not illustrated) and the like. The pressure-sensitive sensor 21f detects a touch on the surface or the like of the display panel 35 with the pen point.

The SoC 21b processes data about the acceleration detected by the acceleration sensor 21c, and successively transmits the resulting data with the ID of the electronic pen 21 to the control circuit 51.

The CPU 51a of the control circuit 51 which has received the notification from an electronic pen 21 determines whether or not the state (or the pattern) in which a user holds the electronic pen 21 occurs, that is, whether or not the electronic pen 21 is being operated, on the basis or the received data.

The configuration of the image display apparatus 11 is described above.

Screen Configuration for the Pen Software and Setting Menus for an Electronic Pen A screen displayed on the display panel 35 of the image display apparatus 11 when the control circuit 51 including the CPU 51a as a central unit executes the pen software will be described.

FIG. 5 is a diagram for describing an exemplary screen displayed on the display panel 35 when the pen software is performed, according to the first embodiment. As illustrated in FIG. 5, the control circuit 51 performs the pen software, and thus displays a writing region 61 mimicking a whiteboard, on the display panel 35. A toolbar 63 in which various operation icons are arranged is displayed below the writing region 61. For example, an icon for setting the pen software, an icon for searching, an icon for switching the board (sheet) of the whiteboard, an icon for displaying a list of sheets, an icon for ending the pen software, and the like are arranged.

In the writing region 61, an indicator 65 is displayed. When the indicator 65 is touched, switching is performed from the indicator 65 to a setting menu (square menu) for an electronic pen. That is, the indicator 65 is a representation icon for invoking a setting menu. In FIG. 5, a single indicator is displayed. However, if multiple electronic pens are registered, indicators, the number of which corresponds to the number of electronic pens, are displayed.

The indicator 65 may be moved to any position in the writing region 61 through a dragging operation. Alternatively, when a user presses the pen point of an electronic pen for a certain period, the indicator 65 may be moved to the position.

Figure 6A:
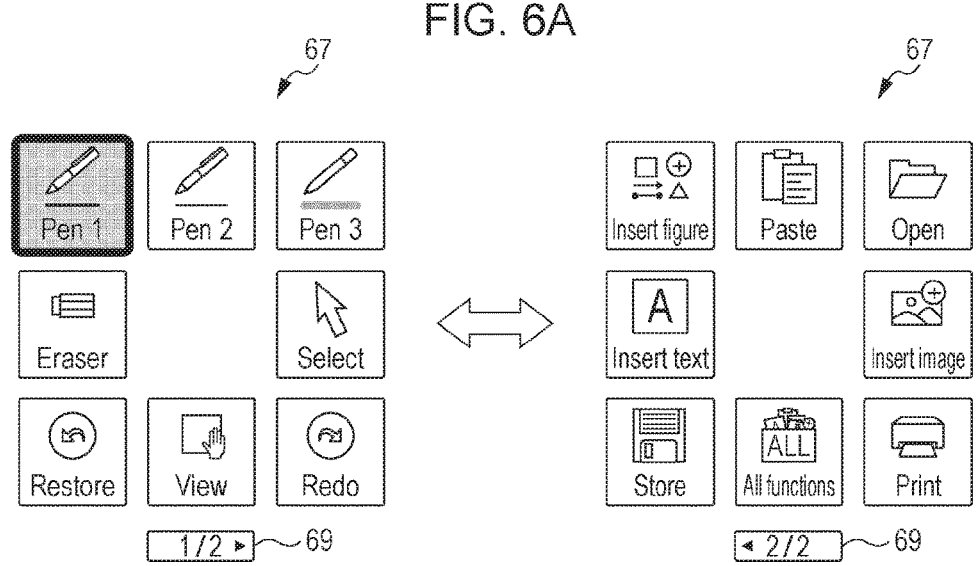
FIG. 6A is a diagram for describing a setting menu displayed in response to a touch operation on an indicator, according to an embodiment.

FIG. 6A is a diagram for describing a setting menu displayed by expanding a single representation icon to multiple icons, each of which corresponds to a setting item, in response to a touch on the indicator 65, according to the first embodiment. As illustrated in FIG. 6A, in a setting menu 67, eight icons are arranged in a rectangular shape. Therefore, the menu is also called a square menu. Each icon of the square menu 67 corresponds to a setting option. In the case where eight options or more are present, if a switching button 69 disposed below the square menu 67 or a blank portion at the center of the icon is touched, switching is performed so that other options are displayed.

In FIG. 6A, the square menu 67 has two pages. Every time the switching button 69 or a blank portion at the center is touched, switching between the first page and the second page is performed. When the outside of the square menu 67 is touched, the square menu 67 is returned to the indicator 65.

In the example in FIG. 6A, the first page includes icons, "Pen 1", "Pen 2", and "Pen 3", for setting a color, a thickness, and the like, and also includes "Eraser", "Select", "Restore", "View", and "Redo". The first page includes eight icons in total. The second page includes eight icons, "Insert figure", "Paste", "Open", "Insert text", "Insert image", "Store", "All functions", and "Print".

To make a setting, basically, any of the eight displayed icons is touched for selection. If the selected icon has a lower-layer submenu, the selected icon is touched again. Then, the submenu is displayed.

Figure 6B:
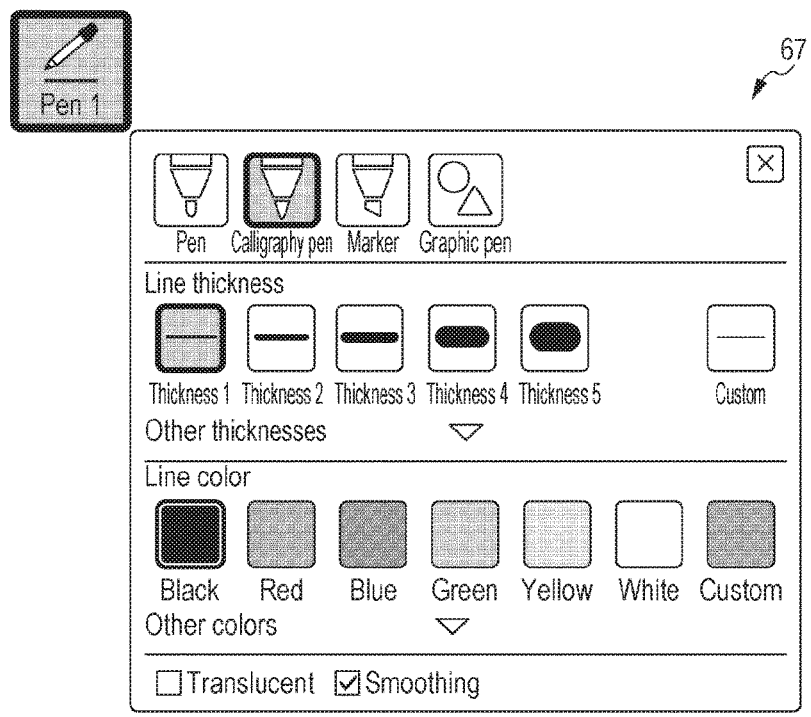
FIG. 6B is a diagram for describing a submenu of the setting menu illustrated in FIG. 6A.

FIG. 6B is a diagram for describing a submenu of the setting menu 67 illustrated in FIG. 6A. An example of the lower-layer submenu of "Pen 1" is illustrated. The background color of the upper-layer "Pen 1" icon is different from those of the other seven icons. This indicates that "Pen 1" is being selected. When the selected "Pen 1" is further touched, the submenu is displayed. In the submenu, items indicating the pen type (Pen, Calligraphy pen, Marker, and Graphic pen), the line thickness, the line color, whether or not a line is translucent, and whether or not a smoothing process is to be performed may be set.

The control circuit 51 may change the illustration of the indicator 65 in accordance with the pen type, the line thickness, and the line color which have been set in the submenu. That is, as illustrated in FIG. 5, the indicator 65 has illustrations of a pen and a line which are drawn with a background pattern of eight rectangles indicating the square menu 67. The indicator 65 may be displayed in the following manner: the illustration of a pen has a shape corresponding to that of the pen type which has been set in the submenu; and the thickness and color of the illustration of a line are corresponding ones selected in the submenu.

In the case where the submenu is displayed, a touch on the upper-layer icon causes the submenu to disappear. Alternatively, a touch on "x" at an upper left corner of the submenu also causes the submenu to disappear.

Displaying a Setting Menu Corresponding to a Pen Being Operated

In the first embodiment, the electronic pen 21 uses the acceleration sensor 21c to detect the state in which a user holds the electronic pen 21. That is, when the electronic pen 21 is put on a cradle or a desk and stays still, an unchanged state continues only with gravity being applied in a certain direction. In contrast, in the state in which a person takes the electronic pen 21 with their hand and the state in which a person holds the electronic pen 21, the pen is moved in a certain period (for example, one second), producing acceleration, or the orientation of the pen is changed, causing a change in the direction in which gravity is applied. The acceleration sensor 21c detects such a movement.

In the first embodiment, the SoC 21b of the electronic pen 21 successively transmits data about the detected acceleration to the image display apparatus 11 body at least during the period in which a temporal change in the magnitude or direction of the acceleration detected by the acceleration sensor 21c occurs.

On reception of the data about acceleration via the wireless dongle 59 from any of the first electronic pen 21-1, the second electronic pen 21-2, and the third electronic pen 21-3, the control circuit 51 of the apparatus body determines how fast the movement of the corresponding electronic pen 21 is.

The control circuit 51 may determine, for example, whether or not the speed of the movement of the electronic pen 21 exceeds a predetermined threshold, or whether or not the period during which the movement is detected exceeds a predetermined time. Thus, the control circuit 51 may determine whether or not the detected movement is noise. Alternatively, the SoC 21b of the electronic pen 21 may make the determination.

When, on the basis of the received acceleration data, the control circuit 51 determines that the corresponding electronic pen 21 is held by a user's hand, the control circuit 51 regards the electronic pen 21 as being operated. The control circuit 51 changes the display mode of the corresponding indicator 65 so that the corresponding electronic pen 21 may be discriminated from the other electronic pens that are not being operated.

Figure 7A:
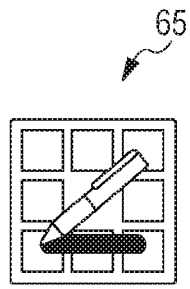
FIGS. 7A to 7C are diagrams for describing changes in the display mode of an indicator, according to an embodiment.
Figure 7B:
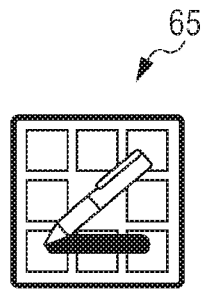
Figure 7C:
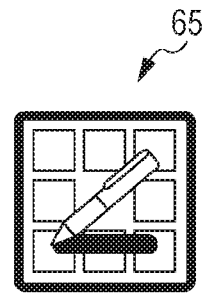

For example, as illustrated in FIGS. 7A to 7C, the control circuit 51 displays the indicator 65 corresponding to the electronic pen 21 that is being operated, in the mode in which the frame is different depending on whether or not the electronic pen 21 is being operated. While the electronic pen 21 is being operated, the indicator 65 is displayed in different modes depending on whether the electronic pen 21 is being operated at a normal speed or the electronic pen 21 is being operated at a fast speed, for example, the pen is shaken in a to-and-fro manner. For example, the display mode is changed as follows. In the state in which the electronic pen 21 is not being operated, the frame is lit. In contrast, in the state in which the electronic pen 21 is being operated, the frame is blinked. When the electronic pen 21 is being operated at a fast speed, the frequency of the blinking is made high.

Figure 10A:
FIGS. 10A to 10C are diagrams for describing other changes, which are different from those in FIGS. 7A to 7C and 9A to 9C, in the display mode of an indicator, according to an embodiment.
Figure 10B:
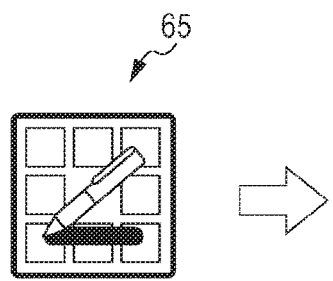
Figure 10C:
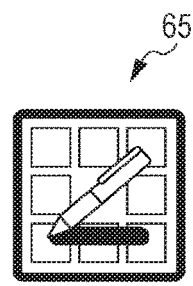

A different configuration may be employed. In the different configuration, in the state in which the electronic pen 21 is not being operated, the corresponding indicator 65 is not displayed (see FIGS. 10A to 10C). The indicator for an electronic pen that is not being operated is not displayed. Not only does this cause electronic pens to be easily identified, but also this causes a drawing operation using an electronic pen that is being operated not to be hindered.

The control circuit 51 lights or blinks the frame of the indicator 65 in accordance with the degree of the magnitude of the absolute value of acceleration detected by the six-axis acceleration sensor 21c, and changes the frequency of the blinking. That is, the detection value of acceleration in the X axis direction detected by the acceleration sensor 21c is represented by $X_g$; the detection value of acceleration in the Y axis direction is represented by $Y_g$; and the detection value of acceleration in the Z axis direction is represented by $Z_g$. In this case, the absolute value $M_g$ of the acceleration is calculated by combining these detection values according to the following expression.

$$M_g = \sqrt{(X_g^2 + Y_g^2 + Z_g^2)}$$

For example, if $M_g$ is less than 1.5 g (g is the unit of acceleration of gravity), the control circuit 51 lights the frame, and does not blink the frame. If $M_g$ is equal to or more than 1.5 g and less than 2.0 g, the control circuit 51 blinks the frame at a blinking frequency of 1.0 Hz. If $M_g$ is equal to or more than 2.0 g and less than 2.5 g, the control circuit 51 blinks the frame at a blinking frequency of 2.0 Hz. If $M_g$ is equal to or more than 2.5 g, the control circuit 51 blinks the frame at a blinking frequency of 3.0 Hz.

Other than this, the color, the density, or the saturation of the frame may be changed depending on whether or not the pen is being operated (see FIGS. 7A and 7B). When the pen is being operated at a faster speed than the normal speed, a thicker frame is displayed (see FIGS. 7B and 7C). Various modified examples, such as an example in which the display mode of the eight rectangles in the background is changed instead of the frame or along with the frame, may be made.

When the user finishes the operation and puts the electronic pen 21 on the tray 18, the acceleration sensor 21c continuously does not detect a movement of the electronic pen 21. The control circuit 51 recognizes this state, and changes the indicator 65 to the display mode for the state in which the electronic pen 21 is not being operated.

For example, assume that a user is drawing with the first electronic pen 21-1; another user is drawing with the second electronic pen 21-2; and the third electronic pen 21-3 is put on the tray 18. The third electronic pen 21-3 is put on the tray 18 and is not being operated. Therefore, the corresponding indicator 65 is displayed in the display mode different from those of the indicators corresponding to the other pens that are being operated. For example, unlike the other indicators 65, the indicator 65 corresponding to the third electronic pen 21-3 remains in the state in which the frame is not blinked. A user may easily recognize that the indicator 65 of which the frame is not blinked does not correspond to the electronic pen held by their hand.

To identify which indicator 65 corresponds to the pen held by a user's hand and which indicator 65 corresponds to a pen held by another user's hand, for example, the user may make the pen held by their hand stay still awhile. For example, the control circuit receives data about acceleration transmitted per second from the electronic pen 21, and changes the display mode of the indicator 65 in accordance with the acceleration data. The pen is made stay still for one second or more. In this period, the indicator 65 is changed to the display mode indicating the state in which the pen is not being operated. Alternatively, the pen is moved at a fast speed, for example, the pen is shaken in a to-and-fro manner for one second or more. In that period, the indicator 65 is changed to the display mode corresponding to the fast speed. The indicator 65 for which the display mode is changed in accordance with the movement of the pen held by the user's hand is the indicator corresponding to the pen that is being held.

When multiple electronic pens are registered, in the case where a color is used for the display mode indicating the electronic pens are being operated, different colors may be assigned to the respective electronic pens. For example, for the display color of the frame in FIGS. 7B and 7C, the frame is displayed with a corresponding specific color: for example, black for the first electronic pen 21-1; red for the second electronic pen 21-2; and blue for the third electronic pen 21-3. Desirably, for example, a user pastes a seal on an electronic pen so that the electronic pen corresponding to a frame color is easily found. The task of pasting a seal is to be done by a user. The display color of the frame is not associated with the line color which is set in the submenu illustrated in FIG. 6B. However, a user is not hindered from setting the line color and the frame color which match each other.

The color assigned to each pen is fixed. For example, when black is assigned to the first electronic pen, black is set as long as the registration is not changed. Even when multiple electronic pens are registered, no electronic pens may be being operated at a moment. Even in this case, the frame of the indicator 65 corresponding to each electronic pen is displayed with its specific color. Therefore, a user may easily identify the indicator corresponding to each electronic pen. When the user is to change the setting of any of the electronic pens, the user will hold the target electronic pen. Therefore, the frame of the corresponding indicator 65 is displayed with its specific color.

Flowchart

Among the above-described functions, processes performed by the control circuit 51 having the CPU 51a as a central unit and the SoC 21b of an electronic pen 21 in order to detect a movement of the electronic pen 21 and change the display mode of the indicator 65 will be described.

Figure 8:
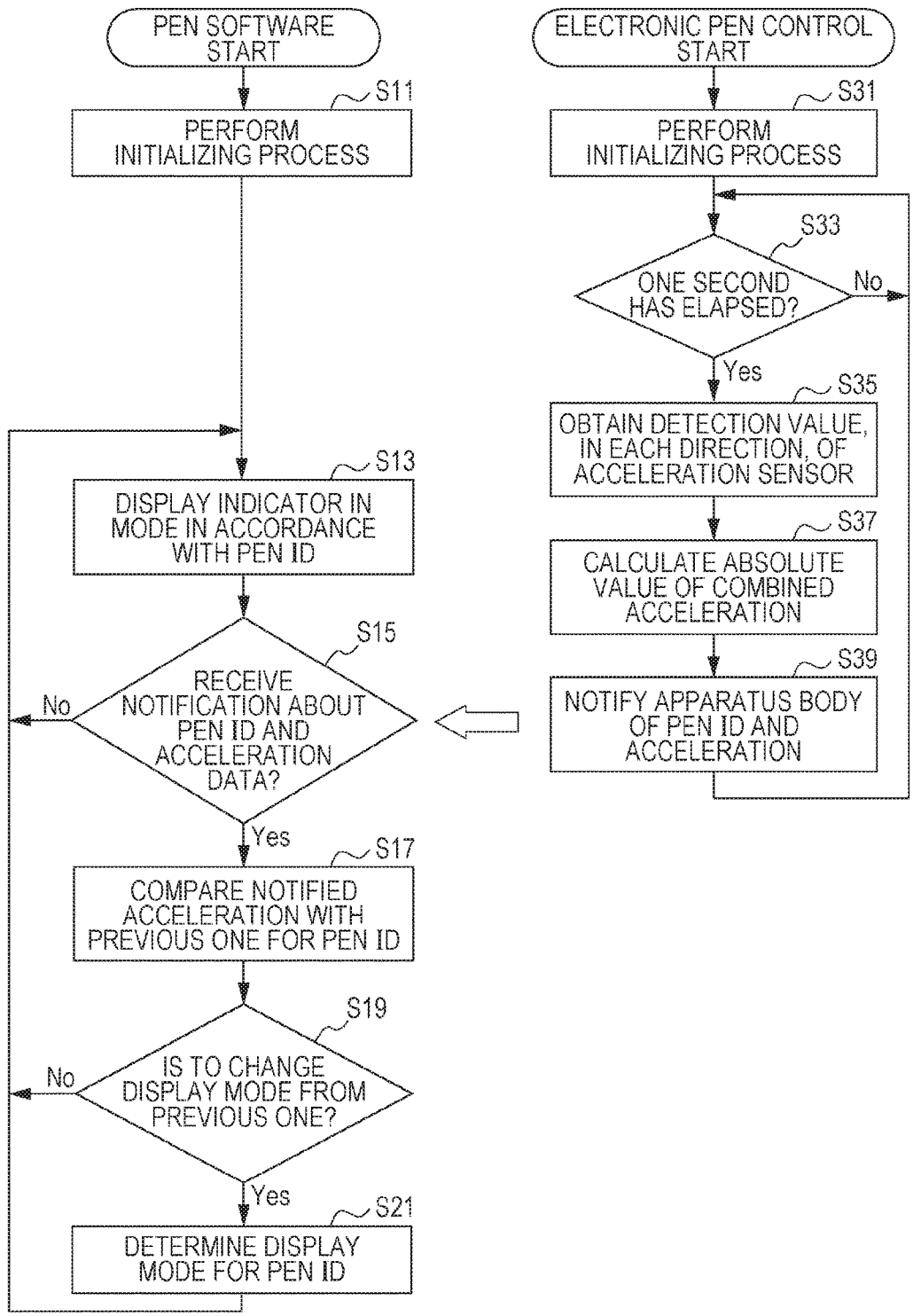
FIG. 8 is a diagram illustrating a flowchart of processes performed by a control circuit of the apparatus body and a flowchart of processes performed by a system-on-a-chip (SoC) of an electronic pen.

FIG. 8 illustrates flowcharts of processes performed by the control circuit 51 of the apparatus body and the SoC 21b of an electronic pen 21. In FIG. 8, the flowchart on the left side indicates processes performed by the control circuit 51, and the flowchart on the right side indicates processes performed by the SoC 21b.

The processes performed by the control circuit 51 of the apparatus body will be described. When power supply of the image display apparatus 11 is turned on and the control circuit 51 having the CPU 51a as a central unit starts operating, a process of initializing an output signal, data, and the display of the display panel 35 is performed. Then, an operation of communicating between the touch sensor and the electronic pen 21 is started (step S11). It is assumed that the electronic pen 21 is registered in advance. The procedure of the registration will not be described.

The control circuit 51 causes the writing region 61 and the toolbar 63 illustrated in FIG. 5 to be displayed on the display panel 35, and causes indicators 65 corresponding to the multiple respective registered electronic pens to be displayed in the writing region 61. Each electronic pen is identified with a corresponding pen ID, and the settings of each electronic pen (such as the pen type and the color and thickness of a line) are stored in the storage device 51f in association with the pen ID. The control circuit 51 causes each indicator to be displayed in the mode according to the settings (step S13).

The control circuit 51 waits for transmission of a notification about acceleration from any of the registered electronic pens 21 (step S15).

Each of the registered electronic pens 21 starts operating in response to a user pressing the corresponding switch 21d. That is, the SoC 21b which has been in the sleep state starts to perform processes in response to an operation of pressing the switch 21d. The SoC 21b of the electronic pen 21 initializes the process data, causes the LED 21e to be lit so that a user is notified of the power having been turned on. The SoC 21b performs a series of initializing processes, such as a process of establishing a wireless communication with the apparatus body and a process of starting monitoring the acceleration sensor 21c and the pressure-sensitive sensor 21f positioned at the pen point (step S31).

After that, the SoC 21b obtains the magnitude and direction of the acceleration detected by the acceleration sensor 21c (step S35) per second (step S33). In the first embodiment, the acceleration sensor 21c supports an object of predetermined mass, such as an iron ball, in the positive and negative X, Y, and Z axes, and detects the magnitudes and changes of forces for the support. In the still state, gravity acts on the object. Therefore, a force supporting the object upward in the vertical axis of the gravity is exerted. That is, the object stays still due to a certain amount of reaction force. Thus, in the state in which a certain force is exerted in a certain direction, the certain direction may be detected so that the orientation of the pen is detected. When the pen is operated, a movement in accordance with the motion of the pen occurs. The acceleration sensor 21c detects the directions and changes in the magnitudes of the forces supporting the object in accordance with the movement.

The acceleration sensor 21c successively outputs data about the detected accelerations to the SoC 21b at time intervals much shorter than one second. When an acquisition timing which is set per second approaches, the SoC 21b may perform sampling and averaging of the acceleration data transmitted from the acceleration sensor 21c. The absolute value of acceleration obtained by combining together the detected accelerations in the X, Y, and X axes is calculated (step S37).

The absolute value of the calculated acceleration is transmitted to the apparatus body along with the pen ID of the pen (step S39).

In addition, the SoC 21b repeatedly performs, per second, the processes in steps S33 to S39 described above, which is not illustrated in FIG. 8. Simultaneously, the SoC 21b monitors the pressure-sensitive sensor 21f so as to transmit the state to the apparatus body, receives an operation on the switch 21d, detects the remaining amount of the battery (not illustrated), and controls lighting of the LED 21e.

Returning to the processes performed by the control circuit 51, description will be made.

If the acceleration data and the pen ID which are transmitted from the electronic pen 21 are received (step S15), the control circuit 51 compares the received acceleration data with acceleration data received last time in association with the same pen ID (step S17). If the comparison result indicates that the absolute value of acceleration changes, crossing a predetermined threshold (Yes in step S19), the display mode of the indicator corresponding to the pen ID is determined on the basis of the latest acceleration data (step S21). The routine is returned to step S13, and a process of displaying the corresponding indicator in the mode determined for each pen ID is repeatedly performed.

The control circuit 51 performs other processes simultaneously, which is not illustrated in FIG. 8, such as a process in which drawing data generated in response to a drawing operation performed by a user using an electronic pen 21 is displayed on the display unit 13, and a process in which an operation that is other than a drawing operation and that is performed by a user (for example, an operation on a setting menu) is received and in which the display or a setting is changed.

The process in which the control circuit 51 determines and changes the display mode of an indicator on the basis of acceleration data of an electronic pen is described above.

Second Embodiment

In the first embodiment, in accordance with data about the acceleration detected by an electronic pen 21, the control circuit 51 determines and changes the display mode (such as the color, whether or not blinking is to be performed, and the blinking speed) of the frame of the indicator (see FIGS. 7A to 7C). Instead, or in addition, the size of the indicator 65 may be changed.

Figure 9A:
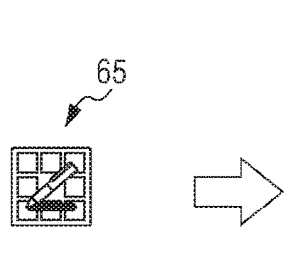
FIGS. 9A to 9C are diagrams for describing changes, which are different from those in FIGS. 7A to 7C, in the display mode of an indicator, according to an embodiment.
Figure 9B:
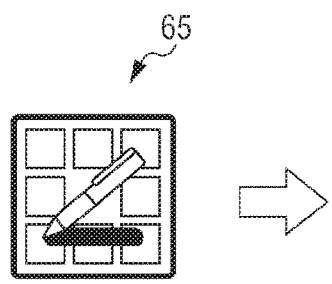
Figure 9C:
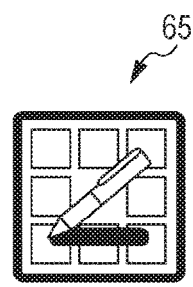

In a second embodiment, during a period in which an electronic pen 21 is not being operated, the control circuit 51 displays the indicator 65 with a smaller size than that in the operating state (see FIGS. 9A and 9B). While the pen is being operated at a faster speed than the normal speed, the indicator may be displayed with a larger size. Alternatively, the indicator may be displayed with a certain size in the operating state, and only the display mode of the frame may be changed as in FIGS. 7B and 7C (see FIGS. 9B and 9C).

Thus, when multiple electronic pens 21 are used, a user may easily recognize whether or not the electronic pen 21 corresponding to each indicator 65 is being operated. If the indicator 65 for a pen that is not being operated is made small, the occupied area may be reduced, alleviating a state in which a drawing operation is hindered.

Third Embodiment

In a third embodiment, the SoC 21b of an electronic pen 21 detects, on the basis of the acceleration sensor 21c, the orientation of the pen as well as the acceleration obtained when the electronic pen 21 moves, and successively transmits the obtained data to the apparatus body. The control circuit of the apparatus body changes the orientation of the illustration of the pen displayed on the indicator 65 in accordance with the orientation of the electronic pen 21.

For example, in the state in which the electronic pen 21 is put on the tray 18 and is not used, the orientation of the electronic pen 21 stays still horizontally. The acceleration sensor 21c detects the orientation, and the SoC 21b transmits data about the orientation. The control circuit 51 of the apparatus body causes the indicator 65 to display an illustration of a pen held horizontally, which corresponds to the orientation. When the electronic pen 21 is held by a user's hand and is oriented obliquely, the control circuit 51 causes the indicator 65 to display an illustration of a pen oriented obliquely in accordance with the orientation. At the same time, when the electronic pen 21 held by a user's hand is moved, the control circuit 51 exerts control so that the display mode is changed, for example, the frame of the indicator is made blink, as described in the first embodiment.

Fourth Embodiment

In the first to third embodiments, an acceleration sensor is used to detect a movement of an electronic pen 21. The detection result is used as a state signal to determine whether or not the electronic pen 21 is being operated. However, the state signal is not limited to a signal obtained on the basis of detection of acceleration.

For example, the image display apparatus 11 provided with a camera may photograph an area near the display panel 35. On the basis of the captured image and the detection signal from the pressure-sensitive sensor 21f of an electronic pen 21, it may be recognized that the electronic pen 21 is being operated. In this case, an electronic pen of which the pen point has touched the display panel 35 may transmit the detection result as the state signal along with the pen ID to the apparatus body. The control circuit 51 having received the state signal may recognize that the electronic pen is being operated. After that, a movement of the electronic pen made after that may be extracted from an image captured by the camera, and it may be recognized whether or not any movement has been made. Thus, it may be determined whether or not the electronic pen is being operated.

For example, an electronic pen provided with a terrestrial magnetism sensor (also called an electronic compass) may detect a change in the orientation of the electronic pen, and may transmit the detected change in the orientation as a state signal along with the pen ID to the apparatus body. The control circuit 51 having received the state signal determines that the electronic pen of which the orientation has changed is an electronic pen that is being operated.

Fifth Embodiment

Instead of the tray 18, a dedicated cradle for supporting an electronic pen, which is not being operated, by inserting the pen point may be provided. A photo-sensor may be disposed in the pen point portion of an electronic pen, and may be used to detect whether or not the pen point portion has been inserted into the cradle. Thus, the detection result may be transmitted as a state signal along with the pen ID to the apparatus body. In the fifth embodiment, the photo-sensor functions as a home position sensor which detects whether or not the electronic pen is positioned in the cradle serving as the home position. When the electronic pen is inserted into the cradle, the control circuit 51 determines that the electronic pen is not being operated.

As described above, (i) an image display apparatus according to the present disclosure includes an operation detecting unit, a display unit, and a controller. The operation detecting unit receives drawing operations and state signals. The drawing operations are performed by using a plurality of electronic pens. Each of the state signals indicates an operation state of a corresponding one of the plurality of electronic pens. The display unit displays an image. The controller generates drawing data in response to each of the drawing operations, and displays setting menus and the drawing data on the display unit. Each of the setting menus is displayed for a corresponding one of the plurality of electronic pens. The controller determines whether or not each of the plurality of electronic pens is being operated. The operation detecting unit receives, from each of the plurality of electronic pens, a signal as the state signal. The signal indicates whether or not the electronic pen is moved or indicating a degree of a speed of a movement of the electronic pen. The controller determines whether or not each of the plurality of electronic pens is being operated on the basis of the state signal from the electronic pen. In accordance with whether or not the electronic pen is being operated, when the electronic pen is being operated, the setting menu corresponding to the electronic pen is displayed in a display mode that is different depending on the degree of the speed of the movement.

In the present disclosure, a drawing operation is an operation of drawing display objects, such as characters and images, by using an electronic pen. Its specific form is, for example, an operation of drawing lines and characters freehand. Other than this, examples of a drawing operation include instruction operations and input/edit operations which are similar to those for drawing illustrations and the like by using typical drawing software.

The drawing data is data about objects that are to be displayed on a display unit in accordance with drawing operations. Its specific form is, for example, data for displaying a line in accordance with positions touched by a pen point or displaying a figure, such as a rectangle, an ellipse, or a polygon, of which the position, the size and the like are specified by using an electronic pen.

A setting menu is a display object displayed for setting and checking attributes of an electronic pen. Through an operation on the setting menu, for example, attributes of a line, such as the thickness and the color, used when an electronic pen is used to perform drawing may be set. In addition, resulting information of the setting may be displayed and checked.

The state in which an electronic pen is being operated includes the state in which a user uses an electronic pen to perform drawing (the state in which drawing is being performed). However, this is not limiting. For example, the state includes the state in which an operation related to selection in a setting menu is being operated. More broadly, if a user holds an electronic pen with their hand, this may indicate the state in which the electronic pen is being operated.

The degree of the speed of a movement does not necessarily reflect the exact speed of the movement. The degree of the speed of a movement may indicate a stepwise magnitude of speed. For example, a movement may be expressed by using at least three stages, such as no movement, a slow movement, and a fast movement. In this case, for example, the magnitude of the speed of a movement may be determined depending on whether the acceleration exceeds a first threshold. In addition, whether or not a pen is moved may be determined depending on whether the acceleration exceeds a second threshold smaller than the first threshold. The determination as to whether or not a pen is moved is to be performed anytime. However, the number of stages indicating the speed of a movement may be any.

Desirable aspects of the present disclosure will be described.

(ii) Each of the plurality of electronic pens may have an acceleration sensor. The acceleration sensor detects acceleration and an orientation and outputs a signal as the state signal. The signal is generated in accordance with the degree of the speed of the movement of the electronic pen and the orientation of the electronic pen. On the basis of the state signal, the controller may display the setting menu in the display mode in accordance with the degree of the speed of the movement and the orientation.

Thus, the acceleration sensor is used to detect an operation on the electronic pen and acceleration produced due to the action of gravity and obtain the degree of the speed of a movement and the orientation. In the display mode corresponding to such information, a setting menu is displayed. Even when multiple electronic pens are being used simultaneously, an operation of setting each pen and checking the settings may be easily performed without confusion with other pens. For example, while a user shakes a pen or changes the orientation of the pen, the user identifies a setting menu of which the display mode is changed in accordance with such an operation. The user may easily find a setting menu corresponding to the electronic pen.

(iii) On the basis of the state signals, the controller may display the setting menu for an electronic pen that is being operated, in a larger size than the size of the setting menu for an electronic pen that is not being operated.

Thus, while the setting menu corresponding to an electronic pen that is not being operated is displayed in a small size so as not to hinder a drawing operation, the setting menu corresponding to an electronic pen that is being operated is displayed in a large size so that setting and checking are easily performed. Thus, both may be easily discriminated from each other.

(iv) The controller may display the setting menu for an electronic pen that is being operated, in a size corresponding to the degree of the speed of the movement, and, as the electronic pen is being moved at a higher speed, the setting menu may be displayed in a larger size.

Thus, even when multiple electronic pens are being operated, the corresponding setting menus are displayed in the respective sizes corresponding to the degrees of the speeds of the movements. Thus, the corresponding setting menus may be easily discriminated from each other.

(v) On the basis of the state signals, the controller may display the setting menu for an electronic pen that is being operated, but may not display the setting menu for an electronic pen that is not being operated.

Thus, the setting menu corresponding to an electronic pen that is not being operated is not displayed. Accordingly, the setting menu corresponding to an electronic pen that is being operated may be easily discriminated.

(vi) On the basis of the state signals, the controller may blink the setting menu for an electronic pen that is being operated, at a frequency in accordance with the degree of the speed of the movement, and may light and display the setting menu of an electronic pen that is not being operated.

Thus, even when multiple electronic pens are being operated, the corresponding setting menus are displayed in sizes corresponding to the degrees of the speeds of the movements, and the setting menus for electronic pens that are not being operated are lit and displayed. Accordingly, the corresponding setting menus may be easily discriminated.

(vii) In response to a given operation, the display mode of the setting menu may be capable of being changed from individual setting items to a representation icon, or may be capable of being changed from the representation icon to the individual setting items. In accordance with whether or not a corresponding electronic pen is being operated, the controller may at least make the display mode of a frame portion of the representation icon different or make a size of the representation icon different.

Thus, the display modes of representation icons are different from each other. Accordingly, an electronic pen that is being operated may be easily discriminated.

(viii) Each of the plurality of electronic pens may further include a home position sensor that detects whether or not a pen point portion of the electronic pen is inserted into a cradle. The operation detecting unit may receive the state signal including output from the home position sensor. The controller may use the output from the home position sensor to determine whether or not the electronic pen is being operated.

Thus, it is determined whether or not each electronic pen is inserted into the cradle. Accordingly, determination as to whether or not a pen is being used is made with more certainty.

The present disclosure contains subject matter related to that disclosed in Japanese Priority Patent Application JP 2017-007857 filed in the Japan Patent Office on Jan. 19, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
an operation detecting unit that receives drawing operations and state signals, the drawing operations being performed by using a plurality of electronic pens, each of the state signals indicating an operation state of a corresponding one of the plurality of electronic pens;
a display unit that displays an image; and
a controller that generates drawing data in response to each of the drawing operations, and that displays setting menus and the drawing data on the display unit, each of the setting menus being displayed for a corresponding one of the plurality of electronic pens, the controller determining whether or not each of the plurality of electronic pens is being operated,
wherein the operation detecting unit receives, from each of the plurality of electronic pens, a signal as the state signal, the signal indicating whether or not the electronic pen is moved or indicating a degree of a speed of a movement of the electronic pen, and
wherein the controller determines whether or not each of the plurality of electronic pens is being operated on the basis of the state signal received from the electronic pen, and, when it is determined that the electronic pen is being operated, the setting menu corresponding to the electronic pen is displayed in a display mode that is different depending on the degree of the speed of the movement.

2. The image display apparatus according to claim 1,
wherein the operation detecting unit receives the state signal from each of the plurality of electronic pens, each of the plurality of electronic pens having an acceleration sensor, the acceleration sensor detecting acceleration and an orientation and outputting a signal as the state signal, the signal being generated in accordance with the degree of the speed of the movement of the electronic pen and the orientation of the electronic pen, and
wherein, on the basis of the state signal, the controller displays the setting menu in the display mode in accordance with the degree of the speed of the movement and the orientation.

3. The image display apparatus according to claim 1,
wherein, on the basis of the state signals, the controller displays the setting menu for an electronic pen that is being operated, in a larger size than the size of the setting menu for an electronic pen that is not being operated.

4. The image display apparatus according to claim 3,
wherein the controller displays the setting menu for an electronic pen that is being operated, in a size corresponding to the degree of the speed of the movement, and, as the electronic pen is being moved at a higher speed, the setting menu is displayed in a larger size.

5. The image display apparatus according to claim 1,
wherein, on the basis of the state signals, the controller displays the setting menu for an electronic pen that is being operated, but does not display the setting menu for an electronic pen that is not being operated.

6. The image display apparatus according to claim 1,
wherein, on the basis of the state signals, the controller blinks the setting menu for an electronic pen that is being operated, at a frequency in accordance with the degree of the speed of the movement, and lights and displays the setting menu of an electronic pen that is not being operated.

7. The image display apparatus according to claim 1,
wherein, in response to a given operation, the display mode of the setting menu is capable of being changed from individual setting items to a representation icon, or is capable of being changed from the representation icon to the individual setting items, and
wherein, in accordance with whether or not a corresponding electronic pen is being operated, the controller at least makes the display mode of a frame portion of the representation icon different or makes a size of the representation icon different.

8. The image display apparatus according to claim 1,
wherein, from each of the plurality of electronic pens further including a home position sensor that detects whether or not a pen point portion of the electronic pen is inserted into a cradle, the operation detecting unit receives the state signal including output from the home position sensor, and
wherein the controller uses the output from the home position sensor to determine whether or not the electronic pen is being operated.

9. A display method for an image display apparatus, the method comprising:
receiving drawing operations and state signals, the drawing operations being performed by using a plurality of electronic pens, each of the state signals indicating an operation state of a corresponding one of the plurality of electronic pens;
displaying an image; and
generating drawing data in response to each of the drawing operations, displaying setting menus and the drawing data on the image display apparatus, each of the setting menus being displayed for a corresponding one of the plurality of electronic pens, and determining whether or not each of the plurality of electronic pens is being operated,
wherein a signal is received from each of the plurality of electronic pens as the state signal, the signal indicating whether or not the electronic pen is moved or indicating a degree of a speed of a movement of the electronic pen, and
wherein it is determined whether or not each of the plurality of electronic pens is being operated on the basis of the state signal received from the electronic pen, and, when the electronic pen is being operated, the setting menu corresponding to the electronic pen is displayed in a display mode that is different depending on the degree of the speed of the movement.

10. A non-transitory computer readable medium storing a program for causing a computer to perform a display process for an image display apparatus, the process comprising:
receiving drawing operations and state signals, the drawing operations being performed by using a plurality of electronic pens, each of the state signals indicating an operation state of a corresponding one of the plurality of electronic pens;
displaying an image; and
generating drawing data in response to each of the drawing operations, displaying setting menus and the drawing data on the image display apparatus, each of the setting menus being displayed for a corresponding one of the plurality of electronic pens, and determining whether or not each of the plurality of electronic pens is being operated, wherein a signal is received from each of the plurality of electronic pens as the state signal, the signal indicating whether or not the electronic pen is moved or indicating a degree of a speed of a movement of the electronic pen, and wherein it is determined whether or not each of the plurality of electronic pens is being operated on the basis of the state signal received from the electronic pen, and, when the electronic pen is being operated, the setting menu corresponding to the electronic pen is displayed in a display mode that is different depending on the degree of the speed of the movement.

* * * * *